US009019504B2

(12) United States Patent
Buchhorn et al.

(10) Patent No.: US 9,019,504 B2
(45) Date of Patent: Apr. 28, 2015

(54) PORTABLE GONIOSPECTROMETER WITH CONSTANT OBSERVATION CENTRE

(75) Inventors: Marcel Buchhorn, Stahnsdorf (DE); Reinhold Petereit, Osterholz-Scharmbeck (DE)

(73) Assignee: Alfred-Wegener-Institut Helmholtz-Zentrum Fuer Polar- und Meeresforschung, Bremerhaven (DE)

( * ) Notice: Subject to any disclaimer, the term of this patent is extended or adjusted under 35 U.S.C. 154(b) by 0 days.

(21) Appl. No.: 14/235,458

(22) PCT Filed: Jun. 27, 2012

(86) PCT No.: PCT/DE2012/000681
§ 371 (c)(1),
(2), (4) Date: Jan. 28, 2014

(87) PCT Pub. No.: WO2013/013652
PCT Pub. Date: Jan. 31, 2013

(65) Prior Publication Data
US 2014/0152985 A1    Jun. 5, 2014

(30) Foreign Application Priority Data

Jul. 28, 2011   (DE) .......................... 10 2011 109 167
Oct. 25, 2011   (CV) .......................... 10 2011 117 713

(51) Int. Cl.
*G01N 21/47* (2006.01)
*G01N 21/55* (2014.01)
(Continued)

(52) U.S. Cl.
CPC ............. *G01J 3/0278* (2013.01); *G01J 1/0242* (2013.01); *G01J 3/0291* (2013.01)

(58) Field of Classification Search
CPC ...... G01J 1/0242; G01J 3/0278; G01J 3/0291
USPC .......... 356/446, 402–425, 300–334, 340, 445
See application file for complete search history.

(56) References Cited

U.S. PATENT DOCUMENTS 4,358,202 A * 11/1982 Puffer et al. .................. 356/430
5,206,700 A *  4/1993 Reynolds et al. .......... 356/237.2
(Continued)

FOREIGN PATENT DOCUMENTS

DE         2643647 A1    4/1977
EP         1470413 B1    4/2010
WO    WO 2006056647 A1  6/2006

OTHER PUBLICATIONS

Milton, et al., "Progress in field spectroscopy", Remote Sensing of Environment, Aug. 13, 2007, pp. 1-18, Elsevier.
(Continued)

*Primary Examiner* — Tarifur Chowdhury
*Assistant Examiner* — Sunghee Y Gray
(74) *Attorney, Agent, or Firm* — Leydig, Voit & Mayer, Ltd.

(57) ABSTRACT

A transportable goniospectrometer with a constant observation center for a radiometric measurement of the reflection of a natural surface includes a spectrometer having an optical unit and a sensor. A main pillar has a lower and an upper pillar end. An arc has a fixed and a free arc end. A slide is disposed displaceably and fixably along the arc. The slide carries the optical unit orientated towards the observation center. A cantilever has a fixed cantilever end connected to the upper pillar end via a screw connection, and a free cantilever end which has a suspension that is rotatable and fixable about a vertical axis. The suspension is connected to the sensor and to the fixed arc end of the arc. The suspension is configured to position the arc at a distance of the arc radius of the arc above the natural surface.

24 Claims, 10 Drawing Sheets

(51) Int. Cl.

| | | |
|---|---|---|
| G01J 1/00 | (2006.01) | |
| G01J 1/56 | (2006.01) | |
| G01J 1/42 | (2006.01) | |
| G01J 3/28 | (2006.01) | |
| G01J 3/00 | (2006.01) | |
| G01N 21/00 | (2006.01) | |
| G01J 3/52 | (2006.01) | |
| G01J 3/46 | (2006.01) | |
| G01J 3/02 | (2006.01) | |
| G01J 1/02 | (2006.01) | |

(56) References Cited

U.S. PATENT DOCUMENTS

| | | | |
|---|---|---|---|
| 7,679,756 B2* | 3/2010 | Sperling et al. | 356/600 |
| 2005/0062964 A1* | 3/2005 | Guttman | 356/319 |
| 2007/0258093 A1* | 11/2007 | Sieck et al. | 356/446 |

OTHER PUBLICATIONS

Painter, et al., "Automated spectro-goniometer: A sephircal robot for the field measurement of the directional reflectance of snow", Review of scientific instruments, vol. 74, No. 12, Dec. 2013, pp. 5179-5188.

Coburn, et al., "A low-cost field and laboratory goniometer system for estimating hyperspectral bidirectional reflectance", Can. J. Remote Sensing, vol. 32, No. 3, Dec. 2006, pp. 244-253.

Schopfer, et al., "The improved dual-view field goniometer system FIGOS", Sensors 2008, vol. 8, Aug. 28, 2008, pp. 5120-5140.

Suomalainen, et al., "Polarised Multiangular Reflectance Measurements Using the Finnish Geodetic Institute Field Goniospectrometer", Seonsors 2009, vol. 9, May 22, 2009, pp. 3891-3907.

Bourgeois, et al., "IAC ETH Goniospectrometer: A Tool for Hyperspectral HDRF Measurements", Journal of Atmospheric and Oceanic Technology, vol. 23, No. 4, Apr. 1, 2006, pp. 573-584.

* cited by examiner

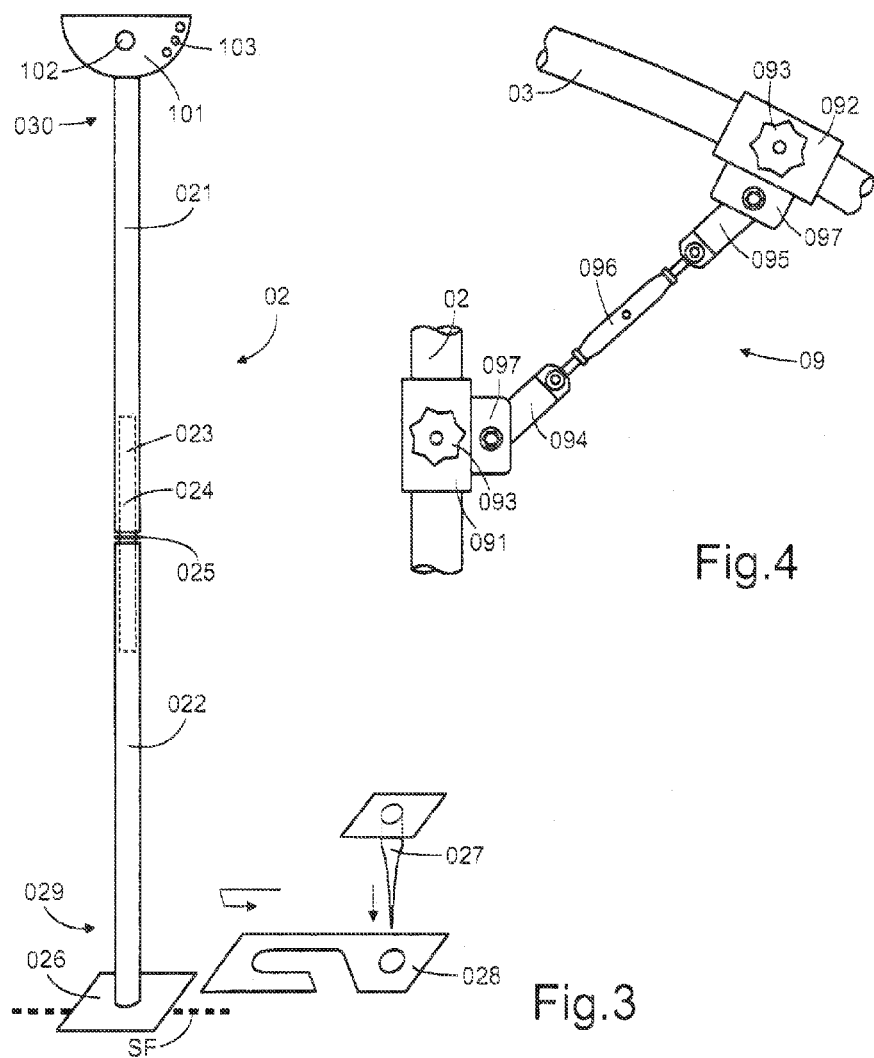

PORTABLE GONIOSPECTROMETER WITH CONSTANT OBSERVATION CENTRE

CROSS-REFERENCE TO PRIOR APPLICATIONS

This application is a U.S. National Phase Application under 35 U.S.C. §371 of International Application No. PCT/DE2012/000681, filed on Jun. 27, 2012, and claims benefit to German Patent Application Nos. DE 10 2011 109 167.3, filed on Jul. 28, 2011 and DE 10 2011 117 713.6, filed on Oct. 25, 2011. The International Application was published in German on Jan. 31, 2013 as WO 2013/013652 under PCT Article 21(2).

FIELD

The invention relates to a transportable goniospectrometer with constant observation center, suitable for the radiometric measurement of the reflection behaviour of a natural surface, with a main pillar, which has a support with respect to the natural surface and is connected at the upper pillar end thereof via a screw connection to the fixed cantilever end of a cantilever, the other cantilever end of which is embodied as a free cantilever end, and with a spectrometer with an optical unit and a sensor, wherein the optical unit is connected to the sensor via an optical fiber.

BACKGROUND

A goniospectrometer (also spectrogoniometer, gonioreflectometer, reflection goniometer, reflectance goniometer or else concisely just goniometer, wherein a goniometer is fundamentally a device for angle determination) is a device for measuring the reflection behaviour of a natural surface, for example a vegetation-covered subsurface. Generally, the bidirectional reflectance distribution function (BRDF) is determined for a given light-incidence and observation direction, i.e. the reflection factor is determined as a function of the position of the sun and the position of the optical unit. In this case, the azimuth angle (angular direction of the sun, measured from a cardinal direction (North inter alia) at)(0° in the clockwise direction to 360°) and the zenith angle (angular position of the sun above the horizon, measured from the horizon)(90° to 0° above the object) are considered as parameters in the observation geometry. The BRDF is a fundamental optical property of the reflecting material. Due to the large variability of the BRDF, depending on the material properties of the surface, practical applications cannot be based on individual nadir measurements of this surface. BRDF models are required which describe the characteristic properties of the object group (grassland, agricultural surface at various phenological stages, etc.). Satellite-based earth observation (since the end of 1970) has required increased investigation of the directed reflection properties of materials and thus the development of models for describing the directed reflection for BRDF correction of spectral satellite data. For example, the vegetation in a permafrost region, e.g. the Siberian Tundra, shows a strongly anisotropic behaviour, i.e. a direction-dependent reflection behaviour of sunlight. The strength of the anisotropy in this case depends on ground moisture, solar zenith angle and zenith angle of the optical unit of the goniospectrometer. Anisotropic reflection behaviour (also anisotropic reflectance or differential spectroscopic reflectance) therefore strongly influences the BRDF.

The BRDF correction of data from wide-angle satellites and narrow-angle satellite missions using oblique imaging methodology. Due to the technical development of satellite mission platforms with greater manoeuvrability and technical improvements, current and future planned national and international satellite missions increasingly use oblique imaging technology, in order to make data acquisition possible in spite of cloud cover. Due to novel technology and mobile platforms, the percentage of oblique images from narrow band satellites is growing disproportionately compared to nadir images. BRDF correction is necessary when quantitative and qualitative parameters of the surface are derived. Wide angle satellites are satellite missions in a high orbit using a broad imaging strip which requires BRDF correction outside of the nadir strip. Wide angle satellite missions are principally long-term satellite missions (NOAH, AVHRR satellite missions since the 70s, NASA MODIS (since 2000)), which provide global parameter maps, e.g. vegetation index, leaf area index, vegetation classes.

The background for field measurements is the fact that climate-induced changes for example in a permafrost region are shown in the change of the surface temperature regime and the moisture regime. Vegetation coverage and vegetation development are therefore influenced in a secondary manner. Permafrost regions make up almost a quarter of the land surface north of the equator and are therefore of global significance, but difficult to access and hitherto only slightly explored scientifically. Hyperspectral remote sensing using satellite missions offers great potential here, in order to deliver models for carbon balancing and for calculating energy and greenhouse gas flows and for exploration of raw materials, the occurrence of which influence the natural surface in a characteristic manner, and for exploring suitable regions for cultivation, for example for grain or oleiferous plants. Novel satellites are also able to produce oblique images of the earth's surface by pivoting, which leads to a multiplying of measurement points compared to simple vertical images. The influence of anisotropy in these oblique images has hitherto not or not satisfactorily been taken into account. To determine whether a correction of oblique images is necessary, in-situ measurements must be carried out under real imaging conditions in the terrain. Goniospectrometers have been used for this for years. A transportable goniospectrometer (also field or site goniospectrometer) is particularly suitable for field use (a laboratory use is however also readily possible). In this case, it has however been shown that known site goniometers are only of limited suitability for custom requirements, particularly logistics, such as transport in inaccessible terrain without roads, small team sizes and high air humidity and cold (which place high demands on operability), in permafrost and Arctic regions. A fundamental distinction can be made between goniospectrometers with constant observation center (measurement location) and goniospectrometers with constant optical unit position. Goniospectrometers with constant observation center for the most part consist of an azimuth ring (corresponds to cardinal direction horizon), on which a zenith ring (corresponds to daily course of the sun) is fastened, which can be moved whilst guided through the azimuth ring. A displaceable slide is fastened on the zenith ring, which carries the optical unit for radiometric measurement and can fix the same freely at a zenith angle. Goniospectrometers with a constant optical unit position for the most part consist of an arm, on which an optical unit is fastened, which can be adjusted to various angles with respect to the object.

"Polarised Multiangular Reflectance Measurements Using the Finnish Geodetic Institute Field Goniospectrometer" by J. Suomalainen et al. (in Sensors 2009, 9, 3891-3907) describes a transportable goniometer (acronym FIGIFIGO) that is used for the radiometric measurement of the reflection behaviour of natural subsurfaces, measurements in the snow are shown. The FIGIFIGO belongs to the category of goniospectrometers with constant observation center and consists of a central main pillar, which has a support in the form of a box opposite the natural surface to be measured, here a blanket of snow as a natural subsurface. The main pillar is laterally pivotably arranged on a longitudinal side of the box. The main pillar is connected at the upper pillar end thereof via a screw connection to the fixed cantilever end of a cantilever. Furthermore, the known goniometer has a spectrometer with an optical unit and a sensor, wherein the optical unit is connected to the sensor via an optical fiber. The optical unit is arranged at the location of the screw connection, a rotatable mirror is located at the end of the cantilever, by means of which the reflections of the blanket of snow are diverted into the optical unit. Thus, the constant observation center is only reached by the mirror and not by the optical unit. The screw connection consists of a type of open shells, which surrounds the round housing and clamped by a screwed connection. The sensor is accommodated together with an analysis unit in the box on the lower pillar end of the main pillar. In a position of the box on the blanket of snow, a measurement series can be carried out using the device in a plane parallel to the front edge of the at various viewing angles (tilting the main pillar along the front edge of the box) in a measurement location (field of vision). In order to be able to carry out measurements in the measurement location, the entire box must be rotated.

The classic field goniospectrometer with constant observation center with the above-described construction made up of azimuth and zenith ring is described in the publication: "The improved Dual-view Field-Goniometer System FIGOS" by J. Schopfer et al. (in Sensors 2008, 8, pp. 5120-5140) and is mentioned here for the sake of the completeness of the overview. The constructively stable, but also space-consuming construction can clearly be seen. Many further site and laboratory goniospectrometers based on the model of the FIGOS have been developed.

The basic type of the goniospectrometer with constant observation center is described in the publication: "A low-cost field and laboratory goniometer system for estimating hyperspectral bidirectional reflectance" by C. A. Coburn et al. (in Can, J. Remote Sensing, Vol. 32, No. 3, pp. 244-253, 2006). It consists of a closed azimuth ring, on which a half zenith ring is rotatably arranged. A slide with the optical unit, which can be travelled to any point on the half-sphere shell, runs on the half zenith ring. A completely automated goniospectrometer with constant observation center is described in the publication: "Automated spectrogoniometer: A spherical robot for the field measurement of the directional reflectance of snow" by T. Painter et al. (in Rev. Sci. Instrum., Vol. 74, No. 12. December 2003, pp. 6179-5177). Here, only a quarter zenith arc, which carries two further arc sections which are each rotatably mounted at the end thereof, is provided over an azimuth arc. The optical unit is arranged at the end of the second arc section. The HRDF (hemispherical directional reflectance function), which in contrast with BRDF also takes account of diffuse reflection of the natural surface, is measured. A good overview of the various developments in the field of field spectrometry up to 2007 is given in the publication: "Progress in field spectroscopy" by E. J. Milton et al. (in Remote Sensing of Environment (2007), doi:10.1016/ j.rse.2007.08001). The various efforts of the user to make the goniospectrometer as light and easily transportable as possible can easily be seen.

A portable goniometer for characterising artificial surfaces is known from WO 2006/056647 A1, the main pillar of which is mounted with three legs as supports. The main pillar can be moved vertically and horizontally along these supports. At the upper pillar end, the main pillar is connected via a screw connection to the fixed cantilever end of a relatively short cantilever. The free cantilever end thereof is securely connected to the center of an arc. The arc carries an X-ray source and an optical unit in a fixed position. By rotating the cantilever about the longitudinal axis thereof, the angles of incidence and observation can be changed relatively to the measurement location in an angular range and measured in the laboratory.

An apparatus for simulating insolation in the laboratory is known from DE 26 43 647 A1, in which an arc pivotable about the horizontal axis of the irradiated object is provided, which carries a further arc with orthogonal alignment to the first arc. The further arc can be displaced along the first arc. A displaceable slide with a light source is arranged on the further arc. The irradiated object is arranged on a rotary table, so that all directed insolations onto every location of the irradiated object can be simulated by means of the interaction of individual rotations, pivoting movements and displacements.

A transportable diffractometer for laboratory measurement with a main pillar is known from EP 1 470 413 B1, which is arranged on a mobile framework. A vertical cantilever is fastened on the main pillar, which is securely connected via a rotatable suspension to an arc. In addition to an x-ray source, a detector, which can be displaced on the arc, is also fastened on the arc. Furthermore, the arc can also be tilted through the plane along the vertical cantilever, so that any desired angular adjustments can be taken up on a full circle about the measurement object.

SUMMARY

In an embodiment, the present invention provides a transportable goniospectrometer with a constant observation center for the radiometric measurement of the reflection behaviour of a natural surface. A spectrometer has an optical unit and a sensor, the optical unit being connected to the sensor via an optical fiber. A main pillar has a lower and an upper pillar end. The main pillar includes a support with respect to the natural surface. An arc has a fixed and a free arc end. A slide is disposed displaceably and fixably along the arc. The slide carries the optical unit orientated towards the observation center. A cantilever has a fixed and a free cantilever end. The fixed cantilever end is connected to the upper pillar end of the main pillar via a screw connection. The free cantilever end has a suspension that is rotatable and fixable about a vertical axis aligned perpendicularly to the natural surface. The suspension is connected to the sensor of the spectrometer and to the fixed arc end of the arc. The suspension is configured to position the arc at a distance of the arc radius of the arc above the natural surface.

BRIEF DESCRIPTION OF THE DRAWINGS

Embodiments of the goniospectrometer according to the invention with constant observation center, particularly suitable for the radiometric measurement of the anisotropic reflection behaviour of a natural surface, are explained in more detail hereinafter for further understanding of the invention on the basis of the schematic figures which are illustrated on various scales. In the figures:

FIG. 3 shows the main pillar in detail,

FIG. 4 shows the cantilever strut in detail.

DETAILED DESCRIPTION

Figure 1:
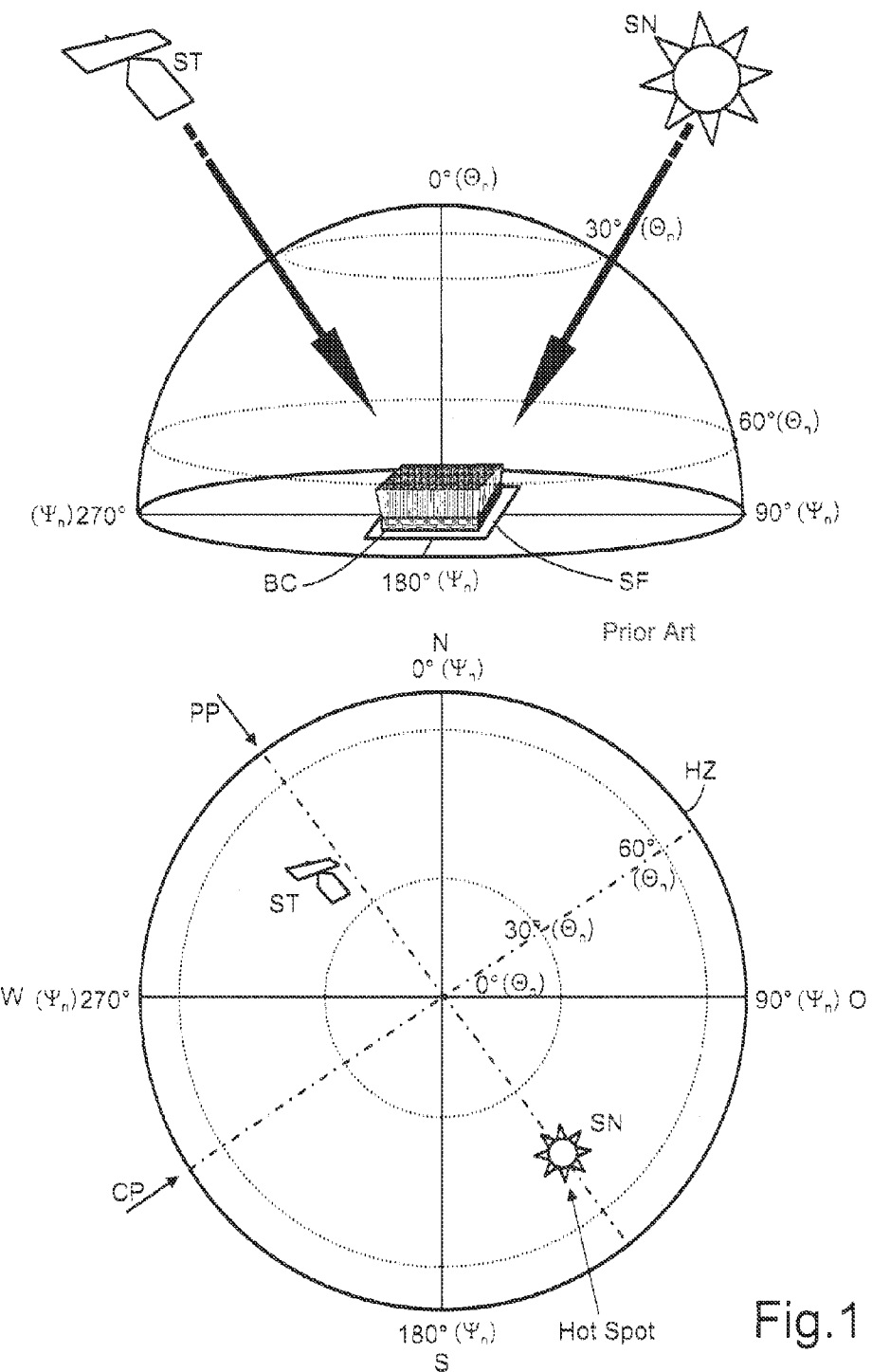
FIG. 1 shows the observation geometry (prior art)

The "Environmental Mapping and Analysis Program" (En-MAP) is the first German hyperspectral satellite mission. The goal is to provide high-quality hyperspectral data for high temporal resolution monitoring of geospherical and biospherical parameters of the earth's surface. The start of EnMAP is planned for 2015. EnMAP charts the earth's surface on a solar synchronous orbit from a height of 643 km using a ground resolution of 30 meters. The scanning width is 30 kilometers, wherein the satellite can process a strip length of up to 5000 km per day. The option of pivoting the satellite by up to +/−30° allows comparative observations of the same location within four days. The satellite, which has a weight of approx. 766 kg, has 218 channels in the reflective spectral range between 420 and 2,450 nanometers. Quantitative information about vegetation, ground and environmental conditions can be derived from the analysis of the spectral signatures. The research project "hy-ARK-VEG" (Hyperspektrale Methodenentwicklung für Arktische Vegetationsbiome [hyperspectral method development for Arctic vegatation biomes] is operated by the Alfred Wegener Institute (AWI) in the context of EnMAP, which is concerned with algorithm development for narrow- and multi-band vegetation indices for permafrost and tundra landscapes. The goal is to link the developed algorithms for vegetation indices (VI) and leaf area indices (LAI) with further improved, quantitative biophysical parameters (empirical derivatives for vegetation coverage and vegetation biomass) in the EnMAP Toolbox. Furthermore, innovative anisotropy investigations are being carried out by means of site goniometer measurements in the Arctic tundra and tundra-equivalent biomes in Central German post-mining landscapes, in order to simulate imaging geometries and to implement normalisation methods for oblique images.

Starting from the transportable goniospectrometer with constant observation center, which was described above, and a cantilever according to the prior art, an embodiment of the present invention develops the same in such a manner that a radiometric measurement of the bidirectional reflectance distribution factor (BRDF) of a natural surface, particularly with anisotropic reflectance behaviour, can be carried out with a freely selectable azimuth and zenith angle of the optical unit for a given radiation source with any desired angle of incidence, particularly insolation. The goniospectrometer according to the invention should be particularly light however and therefore readily transportable, robust and inexpensive, as well as particularly weatherproof, in order to even be able to work in the terrain under difficult operating conditions.

The goniospectrometer developed according to an embodiment of the invention is on the one hand characterised in that the cantilever has a suspension at the free cantilever end thereof, which is connected to the sensor of the spectrometer and to a fixed arc end of an arc. In this case, the suspension is rotatable and fixable about a vertical axis aligned vertically to the natural surface. The other arc end of the arc is embodied as a free arc end. The arc is positioned at the distance of the radius thereof above the natural surface by means of the suspension. Furthermore, provision is made according to the invention for a slide to be arranged on the arc, which carries the optical unit in a radiometric alignment towards the observation center. In this case, the slide can be displaced along the arc and fixed at any point. In the goniospectrometer according to the invention, an arc with defined length is fastened at one end thereof on a rotatable suspension, which for its part is in turn fastened on the end of the cantilever. A lightweight structure similar to a mobile is formed, which allows a simple and light alignment of the arc by rotating the suspension. In this case, the arc is suspended at the distance of the arc radius thereof from the natural surface to be measured, on which the observation center lies. As a result it is ensured that the optical unit is always aligned towards the observation center during the rotation of the arc about the suspension and when during the displacement of the slide along the arc. In the case of a maximum arc length of n and a maximum arc rotation of $2\pi$, the optical unit of the sensor can therefore be adjusted to any azimuth and zenith position on a half-sphere shell with the observation center in the midpoint of the sphere. As a result, it is possible for a given angle of incidence of a radiation source, particularly sunlight, at any desired position on the half-sphere shell, to measure the BRF (bidirectional reflectance factor), which can then be converted to the BRDF value.

The goniospectrometer according to the invention was developed for the above-mentioned research project of the AWI is characterised by a small weight, high transportability and low susceptibility with respect to influences of the weather. The rapid data recording is also particularly advantageous, as it is always only one zenith angle which is adjusted on the arc and then all azimuth angles for this zenith angle can then be measured without further alterations. When operating in accordance with EnMAP specifications (−30° to +30°, viewing zenith angle) and a zenith angle resolution of 10°, only four alterations are necessary, in order to be able to assume all zenith and azimuth positions. Likewise, measurement programmes can be conducted, which allow an azimuth angle resolution of 1°. In this case, the user can basically put together their measurement programme individually for themselves. Furthermore, in addition to EnMAP, other satellites, for example (AVHRR, LINDSAT, meris, modis) can be simulated. The goniospectrometer according to the invention can simulate all EnMAP imaging geometries and thus show the influence of anisotropy on the spectral signature in Arctic regions under real conditions. It combines the advantages of the devices with constant observation center (higher angular accuracy in position adjustment) with those of the devices with a constant optical unit position (lighter, more transportable, quick to assembly).

In a first embodiment of the goniospectrometer according to the invention, the cantilever is embodied in the shape of an arc. This leads to a stable hold of the cantilever at a defined height above the natural surface with the observation center. However, the cantilever is light, transportable and robust in spite of this. A particularly optically aesthetic overall impression results if the cantilever has such a radius of curvature in accordance with the distance thereof from the arc, that the arc and the cantilever are arranged concentrically to one another. In a further embodiment, provision is made for the arc to have such an arc length that starting at the vertical axis, the slide is displaceable through an arc angle (BW) of 30° on the arc. Fundamentally, the arc can have any length up to a quarter circle. Beyond that, a simple alignment of the optical unit towards the observation center is no longer possible. In order to allow a free rotatability of the arc in a full circle with a direction of rotation, a corresponding distance from the cantilever or from the main pillar is to be maintained. In this case, whether the free arc end could strike the cantilever or the main pillar depends on the height of the pillar, the length of the suspension and on the angle of inclination of the cantilever. Otherwise, the arc can also be rotated from both directions of rotation as far as the main pillar or the cantilever. In the case of the inclusion of the goniospectrometer into a programme with a pivotable satellite, the viewing angles of the optical unit into the observation center accordingly depend on the pivot angles of the satellite. In the case of EnMAP, the same can be pivoted through ±30°. Consequently, the optical unit must also be able to assume a viewing angle of 30°. So that the slide can be moved into a corresponding position on the arc, it is therefore only necessary that the arc has an arc length of somewhat more than $\pi/6$. Accordingly, the cantilever can be kept correspondingly short and stable and it can still be ensured that the arc can spin freely therebelow.

In order to be able to place the optical unit at any location of the spherical shell without having to rotate the entire goniometer in the process, it is furthermore advantageous if the suspension is embodied rotatably in a full circle. In the case of a limited range of angles of rotation, the entire apparatus would correspondingly have to be rotated. In the case of a positioning condition of the optical unit only on one half of the spherical shell (in the case of a symmetry of the anisotropy of the reflection), a limited range of angles of rotation may however be sufficient. The suspension can then be designed in a correspondingly simple manner. If, according to a further embodiment of the invention, the suspension is embodied to be manually rotatable and the slide is embodied to be manually displaceable, a further simplification is possible. Dispensing with electrical drives, which can suffer when subjected to the influences of the weather, particularly when subjected to humidity. Thus, the goniospectrometer according to the invention can also be operated in regions with high humidity (e.g. tundra). Additionally, dispensing with electronics and, if appropriate, batteries, results in a reduction in the overall weight of the goniospectrometer.

The manual rotation of the suspension to adjust the azimuth angle of the optical unit and the manual displacement of the slide to adjust the zenith angle of the optical unit is facilitated if a scale, for example with a 1° increment, is provided on the arc. In addition, the scales are also advantageous in the case of motorised adjustment, in order to be able to read the current angular position.

To determine reliable measured values, the distance of the arc above the observation center in the arc radius must be constant. On the one hand, this is achieved in the invention by means of a satisfactory stability of the materials and connections. A further improvement can however be achieved if the fixed cantilever end of the cantilever preferably and advantageously extends beyond the screw connection and is connected to the main pillar behind the screw connection by means of a cantilever strut of adjustable length. A tensile force acting on the suspension and thus on the free cantilever end can consequently no longer lead to a lowering of the cantilever. Furthermore, the cantilever can be stabilised particularly well if the same is advantageously and preferably supported on the main pillar via a cantilever support. The cantilever support is designed as a pure compression strut and reliably prevents the lowering of the cantilever. The same is true for the arc, which similarly to the cantilever has a fixed end and a free end. The stability of the arc can be improved and a lowering can be prevented if preferably and advantageously, the arc is connected to the rotatable suspension by means of an arc strut of adjustable length arranged at the free arc end thereof. Strut and arc are thus rotated together, so that twisting is prevented. Furthermore, the electrical and optical cables between the spectrometer and the sensor or optical unit can be fixed on the arc strut. This can for example take place by means of simple cable ties. During the rotation of the arc strut, the spectrometer is also rotated on the mounting plate thereof by means of the cables fixed thereto and always aligned correctly pointing outwards.

A further point for the manageability and accuracy of the goniospectrometer when operating in the field relates to the support of the main pillar with respect to the natural surface. Closed azimuth circles and compact boxes are known, which can tip however, particularly on uneven surfaces (subsurfaces). Therefore, in the invention, the support of the main pillar with respect to the natural surface is advantageously embodied as a tripod stand, which is connected to the main pillar via a stand sleeve, wherein each leg is connected using the upper leg end thereof to the stand sleeve and using a tripod strut to the main pillar and consists of at least two leg elements which are connected to one another such that the length can be adjusted. A tripod stand allows optimal support and independence from possible ground unevennesses. Via the stand sleeve, the tripod stand is connected to the main pillar in a simple manner, wherein this can take place at different heights, which only has a different pitch angle of the individual legs as a consequence. In this case, the tripod stand can additionally be secured in terms of the stability thereof, if the main pillar at the lower pillar end thereof and the legs of the tripod stand at the lower leg ends thereof, have ground plates which can be fixed on the natural surface via ground spikes for insertion into the natural surface and fixing plates. Alternatively, preferably and advantageously, the main pillar at the lower pillar end thereof and the tripod legs of the tripod stand at the lower leg ends thereof, have articulated ground plates, which can be fixed on the natural surface in ground shoes with ground spikes for insertion into the natural surface. Due to the articulation of the ground plates, the same can be aligned better on the subsurface. The articulation on the main pillar can be fixed in the orthogonal position by means of a push-on sleeve. The ground shoes are anchored in the ground through central holes using the ground spikes and subsequently, the ground plates are adjusted. A rotation of the ground plates in the ground shoes is prevented if the same are for example of rectangular design, whereas round ground plates have parallel flat portions on opposite sides. More detail can be drawn from the exemplary embodiment.

Other important aspects in the case of the goniospectrometer according to the invention are the adaptability thereof and the transportability thereof to the measurement location. Advantageously, the main pillar therefore consists of at least two pillar elements and the cantilever consists of at least two cantilever elements, which are connected to one another so as to be of adjustable length and separable. Preferably and advantageously, the two pillar elements are connected to one another in a foldable manner by means of a fixable folding hinge. In the assembled state, the two pillar elements are then aligned parallel to one another, but furthermore connected to one another; in the mounted state, the two pillar elements linearly flush one behind the other. The folding hinge therefore has a folding angle of 180°. In this case, the column elements and cantilever elements have such tolerances that the same can be accommodated in a compact transport case with handle and wheels or runners. This applies similarly for the tripod stand. The length of the main pillar can easily be adjusted due to the multi-part structure of adjustable length, in order to position the arc at radius distance above the observation center. Due to the adjustability of the length, all components can be optimally adapted to the measurement location and also to one another. Due to the multi-part structure, it is simple to demount and transport the same. In this case it is advantageous if all elements are numbered continuously, in order to be able to assign the same on the basis of mounting drawings. Transport can take place in a box with the dimensions 150×30×50 cm for example. The box can have rubber tyres or balloon tyres for transport on solid ground. For transport on snow, it can alternatively have runners or runners can be pushed over the tyres.

The screw connection is used for connection and to maintain a predetermined angle between the main pillar and the cantilever. In this case, the screw connection must be so secure that the cantilever does not drop under the suspended load. Therefore, in a next modification of the invention, it can preferably and advantageously be provided that the screw connection between main pillar and cantilever is assembled from a pillar plate on the main pillar and a cantilever plate on the cantilever with a central screw connection and a series of fixing screw connections for adjusting an angle between pillar plate and cantilever plate. The central screw connection ensures the secure connection between the plates and the fixing screws ensure secure angular adjustment. A further essential element in the goniospectrometer according to the invention is the rotatable suspension of the arc on the cantilever. Advantageously, the same can be characterised in that the same is assembled from a central rod with an upper mounting plate for the sensor of the spectrometer and a rotary tripod head with a lower mounting plate for fixing the fixed arc end of the arc. The suspension of the arc with the mounting plate for the sensor can be rotated together with the arc, so that no cable convolutions are produced. The rotary tripod head is known in particular from photography, for example, it may be produced by the company MANFROTTO. It allows precise maintenance of angular accuracy and can be rotated through 360°. In this case, the upper mounting plate of the main pillar can be arranged such that it radially points away on the rotatable central rod. The spectrometer which can be arranged on the upper mounting plate then always acts as a counterweight to the cantilever and thus contributes to the further stabilisation thereof.

Alternatively, the rotatable central rod can however preferably and advantageously also have a ball at the upper end thereof, which is accommodated by two mutually connectible half shells, wherein the one half shell is securely connected to the free cantilever end. This type of suspension is modelled on a ball and socket joint and has the advantage that it is stable and precise particularly under tension. Furthermore, provision can preferably and advantageously be made for a mounting hook for mounting a storm cable and a flange plate for mounting a satellite-based position detector are arranged on one of the two half shells. A storm cable, for example two cables which are aligned at an angle to one another in the wind direction and anchored in the ground by means of ground hooks, ensures a reliable position of the goniospectrometer, even in relatively strong winds.

Furthermore, the rotary tripod head can preferably and advantageously be embodied as an angular adjustment module, with an upper adjusting ring for adjusting the cardinal direction, a central adjusting ring for adjusting the azimuth angle and a lower adjusting ring with at least one sliding-block guide for automated adjustability of the angle of the angular adjustment module. Such an angular adjustment module is particularly robust and allows the highest convenience of adjustment with a particularly good readability of the adjusted angle. It is particularly designed for tensile force. It is possible to adjust the cardinal direction initially, then the position of ground level to a sun azimuth in a simple manner and finally the measured angles are run through in automated form. The sliding-block guide in particular, which allows a conversion of predetermined angle intervals to in a purely mechanical manner, is particularly insensitive with regards to difficult weather conditions and allows the implementation of two different measurement routines with different angle intervals for example, large intervals of 5° and fine intervals of 1 for example. More detailed information can be drawn from the exemplary embodiment.

Furthermore, a video camera for observing the observation center during the measurement and occasionally a Spectralon plate with a reflectance 1 for calibrating the optical unit of the spectrometer can advantageously also be connected to the slide. Furthermore, a satellite-based position detector for determining the global position of the goniospectrometer during the measurement can advantageously be fixed on the suspension. Finally, spirit levels can also advantageously be provided for the perpendicular alignment of the main pillar and the optical unit and/or a second spectrometer for measuring the irradiance (radiant flux density which crosses the observation center) and the diffuse reflection of the natural surface. The spirit levels are preferably provided on the main pillar and on the suspension. The second spectrometer can be fixed together with a diffuser on the upper end of the main pillar and is used for determining the HRDF. As an alternative to a direct fixing on the goniospectrometer, in accordance with the invention, it can also be positioned as a stand-alone device in direct proximity to the goniospectrometer according to the invention.

Finally, at least the main pillar, the cantilever, the suspension, the angular adjustment module, the arc, the cantilever support, the slide, the tripod stand and the tripod strut can preferably and advantageously consist of black anodized aluminium. As a result, an insensitive surface with good usage characteristics and a particularly optically aesthetic appearance of the goniospectrometer according to the invention can be achieved. Preferably, all of the structural elements made of aluminium, which are present in the goniospectrometer, are black anodized. By avoiding special coatings, the cracking and flaking off thereof due to mounting, transport and the weather can be avoided. The weather can be of particular importance at possible use locations of the goniospectrometer according to the invention. For example, it can be very cold in the tundra and very humid at the same time. The light conditions can likewise be very poor. Therefore, it is advantageous if at least the screw connection between main pillar and cantilever, the variable length cantilever strut, the variable length arc strut, the leg elements of the tripod stand, the stand sleeve, the pillar elements, the cantilever elements, the fixable folding hinge, the half shells and the angular adjustment module can be mounted manually and without using a further tool. Beneficially, the entire goniospectrometer can be mounted and also demounted exclusively by hand without using mechanical or electrical tools. The same is also true for handling. All adjustments and measuring routines are preferably undertaken without the use of tools. Correspondingly, all screw connections are equipped with T-handles, all other connections are equipped with pins, cotter pins, cable ties or quick-release fasteners and all settings are equipped with relatively large hand rings. Further details of the invention are to be drawn from the following specific part of the description.

FIG. 1 shows the observation geometry from the prior art for anisotropic reflectance measurements, above in the oblique view and below in the nadir view (nadir=the vertical nadir opposite the zenith on the natural surface SF; zenith=the apex of the firmament vertically above the observer. In the oblique view above, the solar path (cardinal directions) are illustrated in projection with various azimuth angles $\Psi_n$ over the solar path (daily course) with various zenith angles $\Theta_n$. Shown in the middle of the projection is a constant observation center BC on a natural surface SF, onto which insolation SN is incident and which is observed by a satellite ST (measurement of the reflected radiation). In the nadir view below, the ground plane is illustrated, which runs through the sun (hot spot) and the transverse plane running orthogonally thereto. The outline constitutes the horizon HZ.

Figure 2:
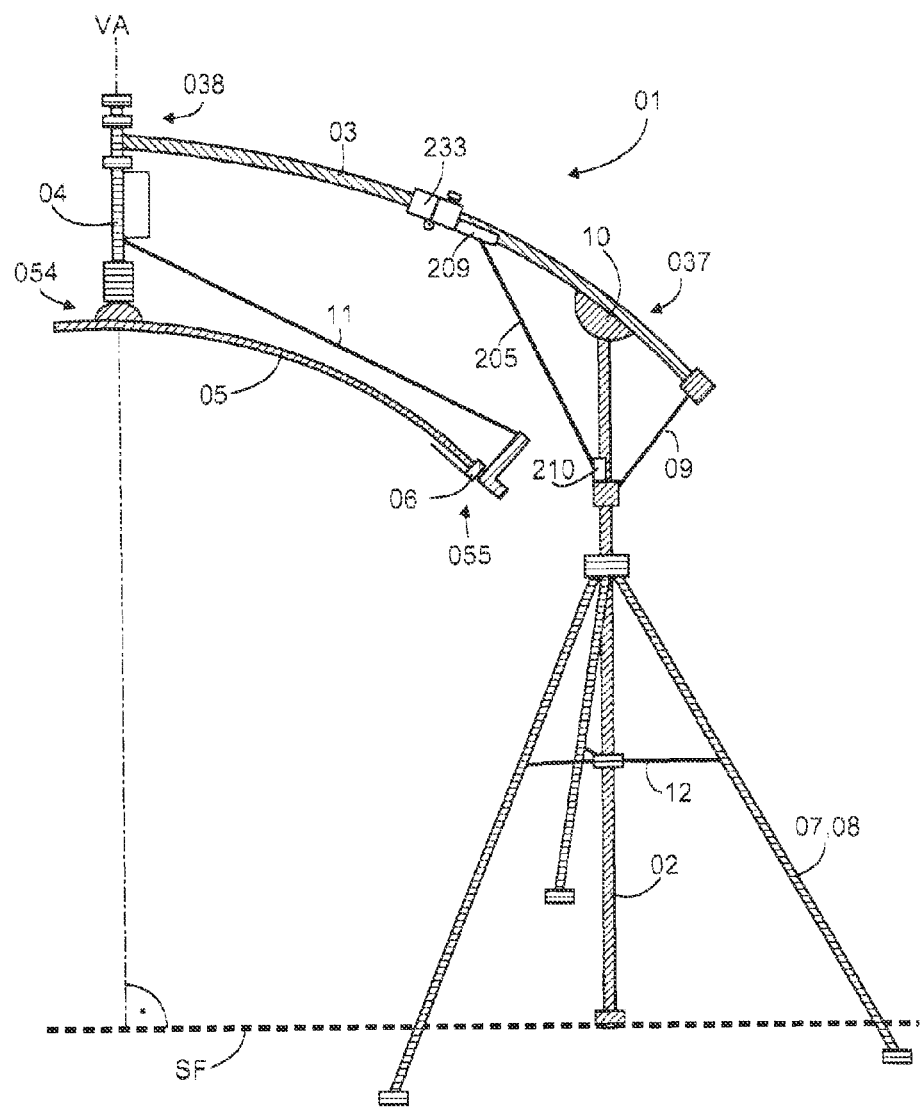
FIG. 2 shows the principal constructive design.

The structure of the transportable goniospectrometer 01 according to the invention is illustrated in a principle schematic in FIG. 2. An uncurved, straight main pillar 02 is shown, with a cantilever 03, a rotatable and fixable suspension 04 (vertical alignment along a vertical axis VA) and an arc 05, on which a slide 06 is displaceably and fixably arranged. Furthermore, a support 08 of the main column 02 is shown in the form of a tripod stand 07, a cantilever strut 09 and a cantilever support 205, as well as a screw connection 10 of the main pillar 02 with respect to the cantilever 03. The cantilever support 205 is supported on one side using a first support shoe 209 with respect to a folding hinge 233 and on the other side using a second support shoe 210 with respect to the main pillar 02 above the cantilever strut 09. Furthermore illustrated are an arc strut 11 and a tripod strut 12. The individual components are explained in more detail hereinafter.

Figure 3A:
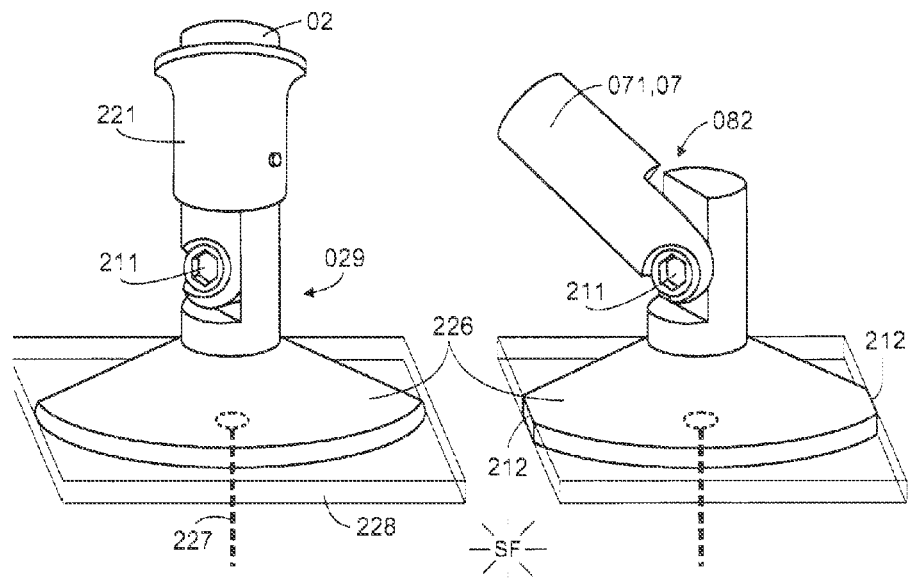
FIG. 3A shows a detail in the region of the lower pillar end and the lower tripod leg end.

FIG. 3 shows the main pillar 02 in detail. Illustrated are two (first, second) column elements 021, 022, which are connected to one another via a connecting piece 023. In the selected exemplary embodiment, the main pillar 02 consists of a 30 mm aluminium tube with an overall length of approx. 2 m. In the selected exemplary embodiment, the connecting piece 023 is a simple push-in coupler 024 with a central web 025. The main pillar 02 carries a ground plate 026 on the lower pillar end 029 for erection on level terrain. A ground spike 027 is used for insertion into the natural surface SF of the soft ground. The ground plate 026 is used as a stop in this case. A fixing plate 028 is pushed over the lower pillar element 022 and fixed in the ground using the ground spike 027. A pillar plate 101, which is part of the screw connection 10, is arranged on the upper pillar element 021 on the upper pillar end 030. A central hole 102 and a series of locating holes 103 can also be seen. These locating holes 103 can also be dispensed with, wherein the pillar plate 101 and the cantilever plate 104 are then designed in a more stable manner and can be securely connected to one another in an angled position with larger contact surface. This results in a larger torsional stiffness.

An alternative ground fixing is shown in a cut-out detail. In this case, the main pillar 02 at the lower pillar end 029 thereof and the tripod legs 071 of the tripod stand 07 at the lower leg ends 082 thereof, each have an articulation 211 and a round ground plate 226 thereon. A better erection on the natural surface SF is possible due to the articulation 211. The articulation 211 on the main pillar 02 can be fixed via a displaceable stop sleeve 221, wherein a spring-loaded locking button 222 comes into engagement in the fixed position. At least the ground plates 226 of the tripods 071 have lateral flat portions 212, using which the same are fixed in square ground shoes 228. The ground shoes 228 are in turn fixed using the ground spikes 227 inserted into the natural surface SF.

FIG. 4 shows the cantilever strut 09 which is arranged on the fixed cantilever end 037 (cf FIG. 6) of the cantilever 03. In the exemplary embodiment shown, the cantilever strut 09 consists of two sleeves 091, 092, which are pushed over the main pillar 02 and over the end of the cantilever 03 and are stopped using a knurled screw 093 (in this case, the knurled screws 093 can also be arranged on the outside of the main pillar 02 and cantilever 03 for better accessibility). An adjusting sleeve 096 is arranged between two tabs 094, 095, by means of which the length of the cantilever strut 09 can be adjusted. All of the elements mentioned are connected to one another via articulations 097.

Figure 5:
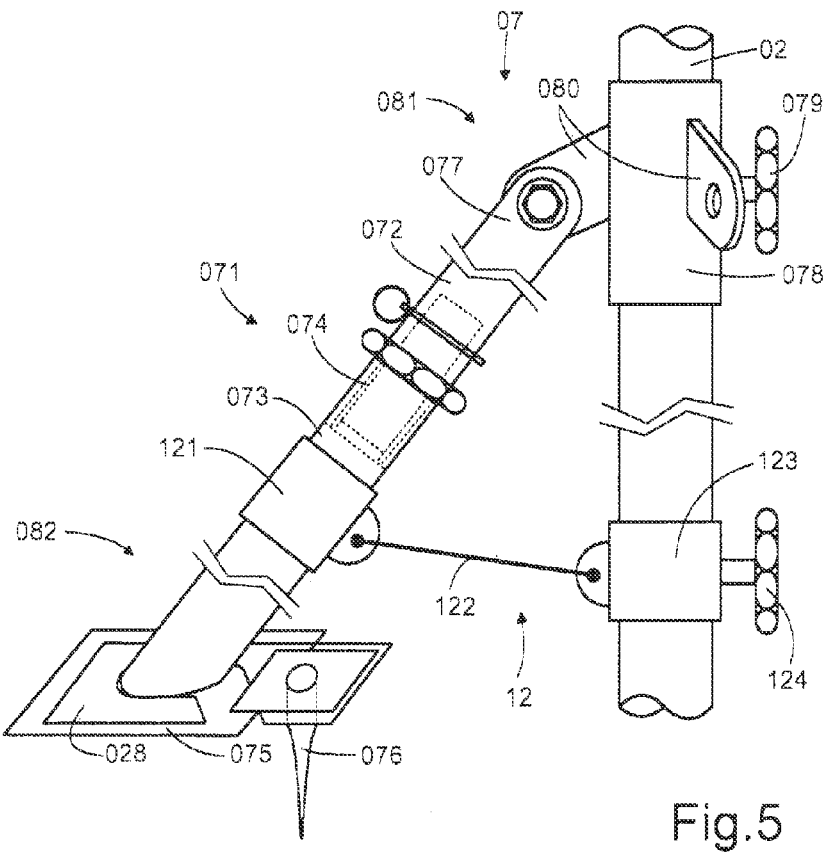
FIG. 5 shows a tripod leg as a support in detail.

A tripod stand 07 is illustrated in FIG. 2 as support 08. FIG. 5 shows a tripod leg 071 in detail, which consists of two leg elements 072, 073 which are connected to one another by means of a plug-in screw connection 074 (mating thread plugged in) such that the length can be adjusted. In the selected exemplary embodiment, each tripod leg 071 consists of a 30 mm aluminium tube with an overall length of approx. 1.75 m. A ground plate 075 is arranged in turn on the lower leg end 082 of the lower leg element 073. The ground plate 075 is fixed with the aid of a ground spike 076 for insertion into the ground and a fixing plate 028. The tripod leg 071 is connected in an articulated manner to a stand sleeve 078 by means of a screw connection plate 077 on the upper tripod leg end 081 thereof, which stand sleeve is pushed over the main pillar 02 and fixed using a knurled screw 079. The stand sleeve 078 has three screw connection tabs 080 (evenly distributed at 120° around the circumference), onto which the three tripod legs 071 are mounted. Furthermore, a tripod strut 12 is arranged on each tripod leg 071, which is assembled from a displaceable and fixable strut sleeve 121 and a strut arm 122. The strut arm 122 is connected to a pillar sleeve 123 which runs on the main pillar 02 and can be fixed in terms of height by means of a locking screw 124. Depending on the height of the arrangement of the tripod strut 12 on the main pillar 02 and on the tripod leg 071 and depending on the length of the strut arm 122, an opening angle of the tripod stand 07 which is preferably approx. 65° results. At this point, it may again be stressed that also the screw connection 074 and the length adjustment of the strut arms 122 can be undertaken in a particularly advantageous manner without tools, that is to say purely manually.

Figure 6A:
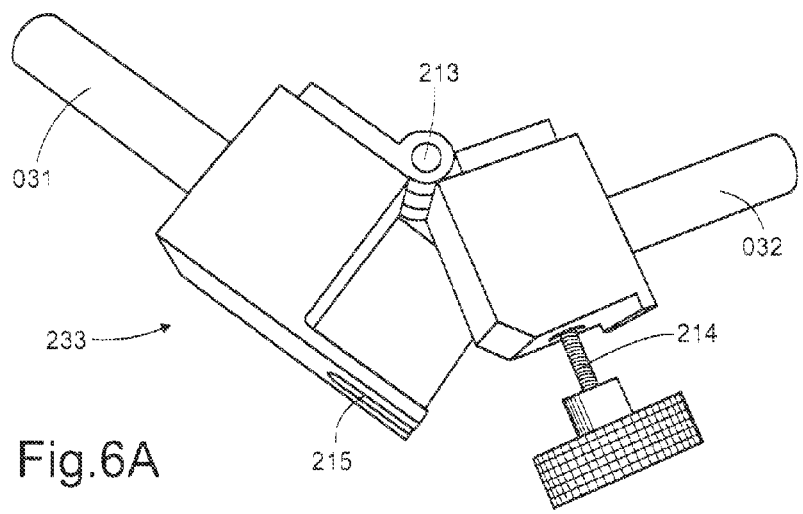
FIG. 6A shows the folding hinge of the cantilever in detail.
Figure 6:
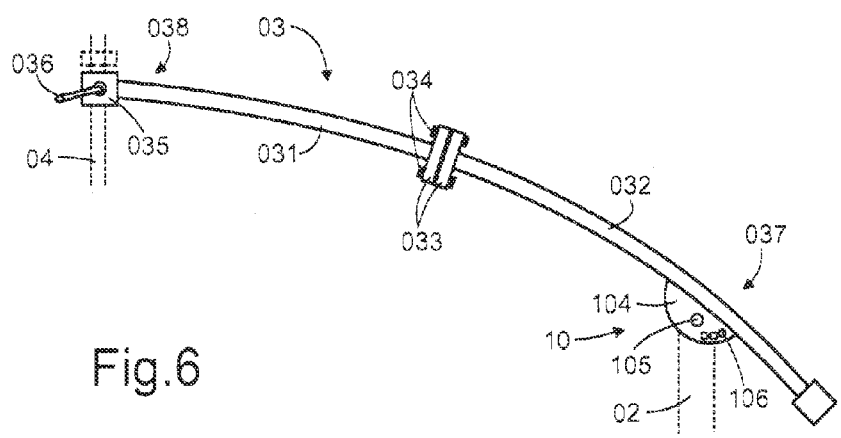
FIG. 6 shows the cantilever in detail.

The cantilever 03 can also consist of a 30 mm (diameter) aluminium tube with a length of approx. 2 m. Identical semi-finished product can therefore be used for the main pillar 02, the tripod stand 07 and the cantilever 03. Further details for the cantilever 03 and for the screw connection 10 are shown in FIG. 6. The cantilever 03 has a fixed cantilever end 037 and a free cantilever end 038. In this case, "free" means unclamped, i.e. open and freely rotatable and "fixed" means clamped, mounted and not freely rotatable. The cantilever 03 is likewise in two parts and consists of two cantilever elements 031, 032 which are connected to one another by means of attached flanges 033 and two fixing screws 034. An adjustability of length is not required for the cantilever 03. The cantilever 03 has an attached ring 035 at the free cantilever end 038 thereof for mounting the suspension 04 using a locking lever 036 for fixing the suspension 04. A cantilever plate 104 with a central hole 105 and a series of locating holes 106 is arranged in front of the fixed cantilever end 039 as part of the screw connection 10 to the main pillar 02. As an alternative, FIG. 6A shows a folding hinge 233 for connecting the two cantilever elements 031, 032. The folding hinge 233 allows a folding angle of 180° by means of a hinge pivot pin 213. Guiding takes place via a guide pin 214 which engages into a guide slot 215.

Figure 7:
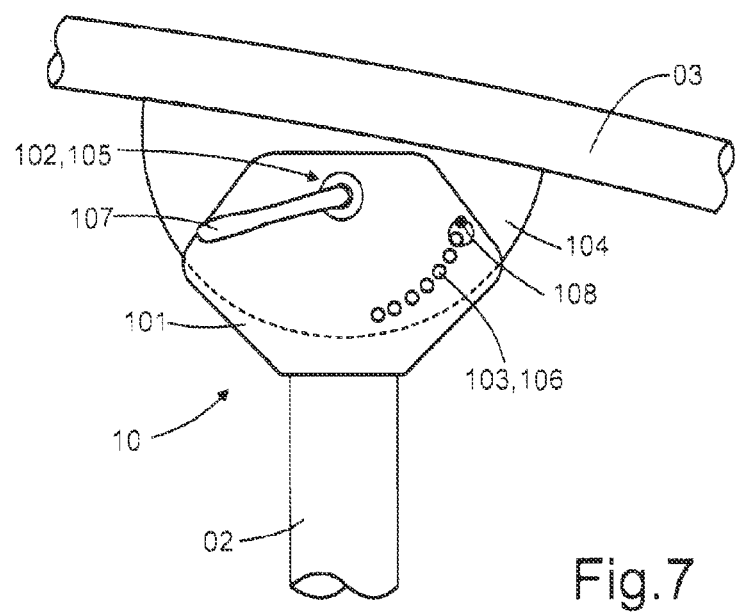
FIG. 7 shows the screw connection in detail.

The screw connection 10 is illustrated in FIG. 7. The pillar plate 101 is securely connected to the cantilever plate 104 by means of a tommy screw 107 through the central holes 102, 105. The angular position of the cantilever 03 with respect to the main pillar 02 is produced by inserting a locating pin 108 into correspondingly superposed locating holes 103, 106 (cf. also the description of FIG. 3).

Figure 8:
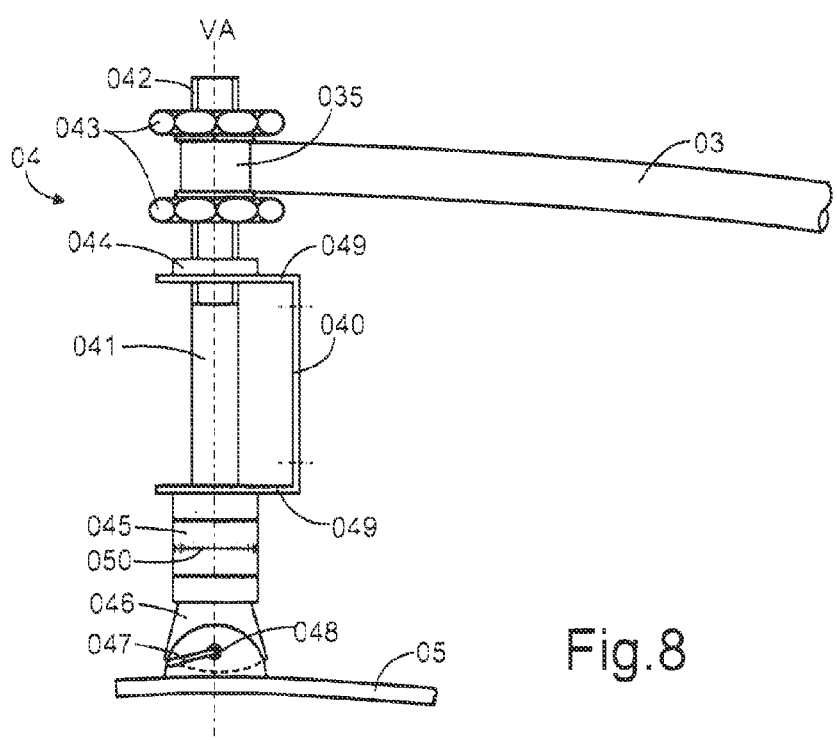
FIG. 8 shows the suspension in a first embodiment in detail.

FIG. 8 shows details for the suspension 04. A central rod 041 carries a thread 042 on the upper end thereof, onto which the ring 035 of the cantilever 03 is pushed and fixed between two threaded nuts 043 made of a frost-proof plastic. Fixing the height of the suspension 04 in relation to the natural surface SF can be undertaken by means of the threaded nuts 043 which can be rotated on the thread 042. The central rod 041 has a rotary tripod head 045 at the lower end with a 360° degree of rotation (for example MANFROTTO part no. 300N, from the company MANFROTTO). A scale 050 is provided for adjusting the rotary tripod head 045. The rotary tripod head 045 has a lower mounting plate 046 at the lower end thereof for a fixing of the arc 05 which can be adjusted in terms of height and angle. Fixing takes place by means of a tommy screw 047 which is screwed into a hole 048. Alternatively, the connection can also take place here by means of two plates milled in such a complementary manner that the arc 05 is always mounted at exactly 90° to the suspension. An upper mounting plate 040 is pushed over the central rod 041 between the rotary tripod head 045 and the cantilever 03 for fixing a sensor of a spectrometer by means of two perforated tabs 049. The upper mounting plate 040 is fixed using a fixing nut 044. The suspension 04 is freely rotatable overall about the ring 035 of the cantilever 03.

Figure 8A:
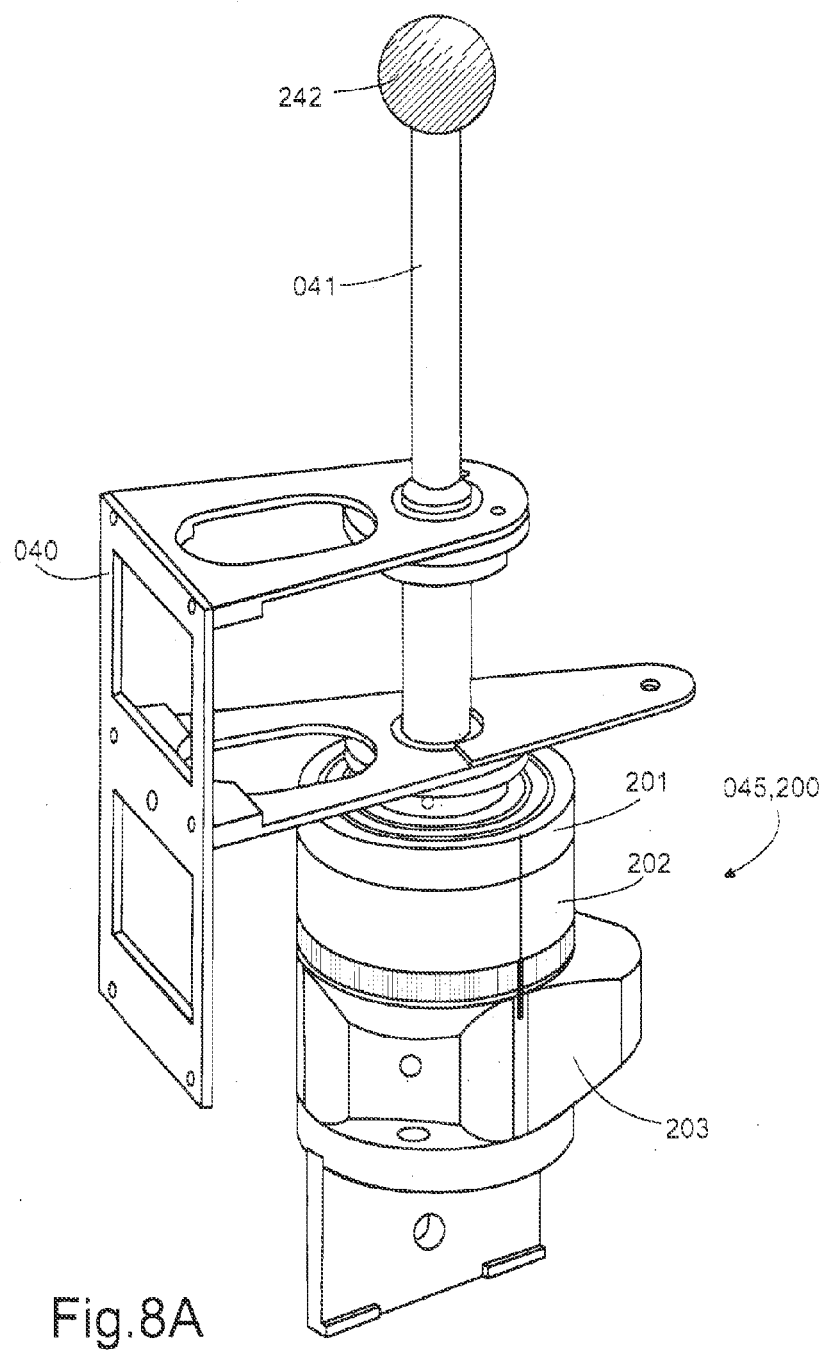
FIG. 8A shows the suspension in a second embodiment in detail.
Figure 8B:
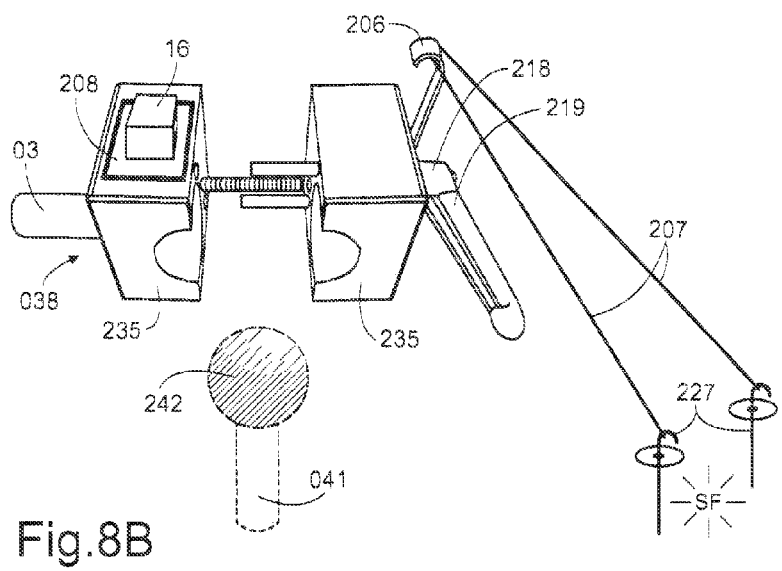
FIG. 8B shows a detail of the suspension in the second embodiment.
Figure 8C:
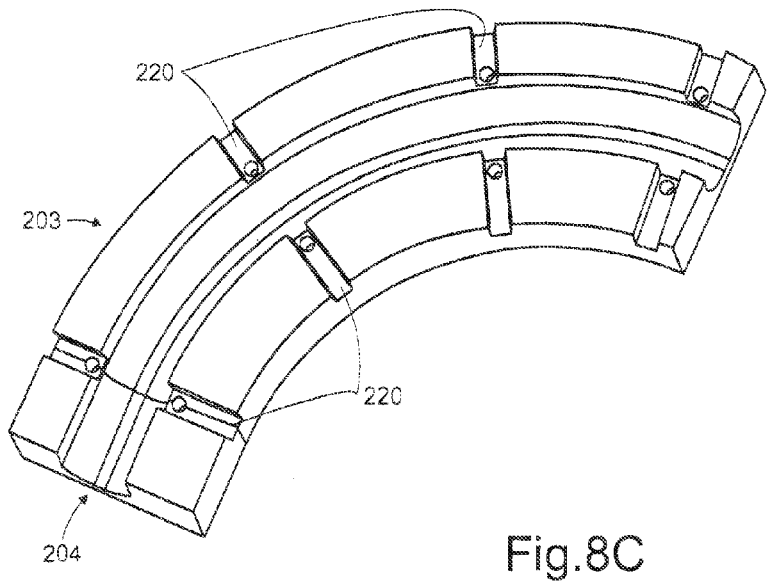
FIG. 8C shows a further detail of the suspension in the second embodiment.

FIG. 8A shows an alternative suspension with a ball 242 on the end of the central rod 041, which is hung in two half shells 235 (cf. FIG. 8B) in the manner of a ball and socket joint. Furthermore, an angular adjustment module 200 is illustrated as rotary tripod head 045, which has an upper adjusting ring 201 for adjusting the cardinal direction, a central adjusting ring 202 for adjusting the azimuth angle and a lower adjusting ring 203 with at least one sliding-block guide 204 (cf. FIG. 8C) for automated adjustability of the angle of the angular adjustment module 200. Furthermore illustrated is a modified upper mounting plate 040 for fixing the spectrometer 13. In this case, the upper mounting plate 040 always faces outwards, so that the spectrometer 13 can act as a counterweight. In FIG. 8B, two half shells 235 for mounting the ball 242 are shown, of which one is securely connected to the free cantilever end 038 of the cantilever 03. The two half shells 235 are guided via pins 216 and screwed to one another via a bolt 217 which engages into a nut 218 with toggle handle 219 after the insertion of the ball 242. Furthermore, a flange plate 208 for mounting the position detector 16 and a mounting hook 206 for mounting a storm cable 207, which are anchored in the natural surface SF by means of ground spikes 227. Finally, in FIG. 8C the lower adjusting ring 203 is illustrated in plan view with a sliding-block guide 204. The angular adjustment module 200 can be fixed on double notches 220, the spacing of which determines the angle intervals for the measurement cycles, by means of a sliding block in the sliding-block guide 204 with corresponding double spring latches which can engage into the notches 220. For example, two sliding-block guides 204 with different notches 220 can be integrated in the angular adjustment module 200 for different angle intervals.

Figure 9:
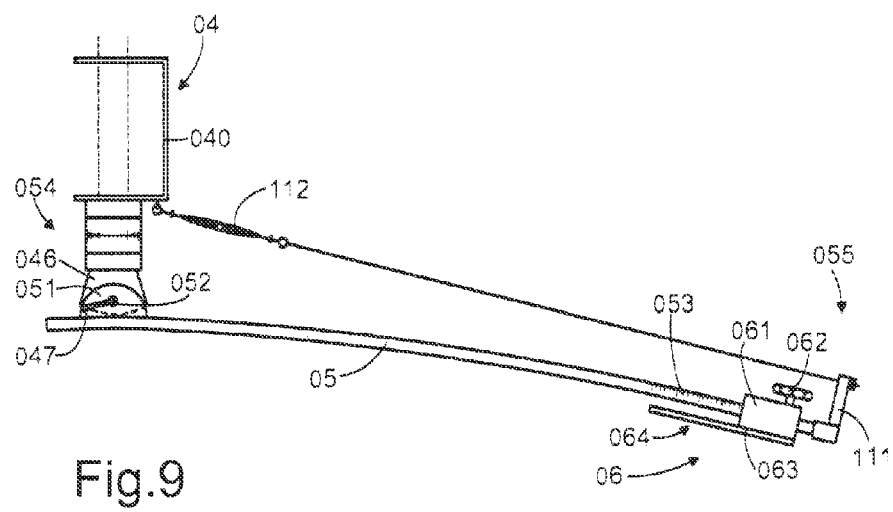
FIG. 9 shows the arc in detail.

FIG. 9 shows the arc 05, which is assembled in one piece with a length of 1.4 m and in the selected exemplary embodiment consists of a 20 mm aluminium tube. The arc 05 has a fixing plate 051 on the fixed arc end 054 thereof, with a slot 052, through which the tommy screw 047 is pushed for fixing on the lower mounting plate 046 of the rotary tripod head 045. A bracing piece 111 which carries the arc strut 11 is arranged on the free arc end 055 of the arc 05. The arc strut 11 is connected via a length adjuster 112 to the suspension 04 or the freely rotatable mounting plate 040 and thus likewise freely rotatable with the arc 05. Although the arc strut 11 is used for stability, it is primarily provided for fixing cables which originate from the spectrometer 13. As a result, the cables are well fixed and the spectrometer 13 is automatically rotated therewith (cf. FIG. 10). The slide 06 is arranged freely displaceably on the arc 05. A scale 053 is provided on the arc 05 for positioning. The displacement takes place via a runner 061 which can be fixed at any location along the arc 05 by means of a fixing screw 062. A runner plate 063 is fixed on the runner 061, which has a plurality of holes 064 for mounting the optical unit 131 (pre-optical unit) of the spectrometer 13 and, if appropriate, further components (cf. FIG. 10).

Figure 10:
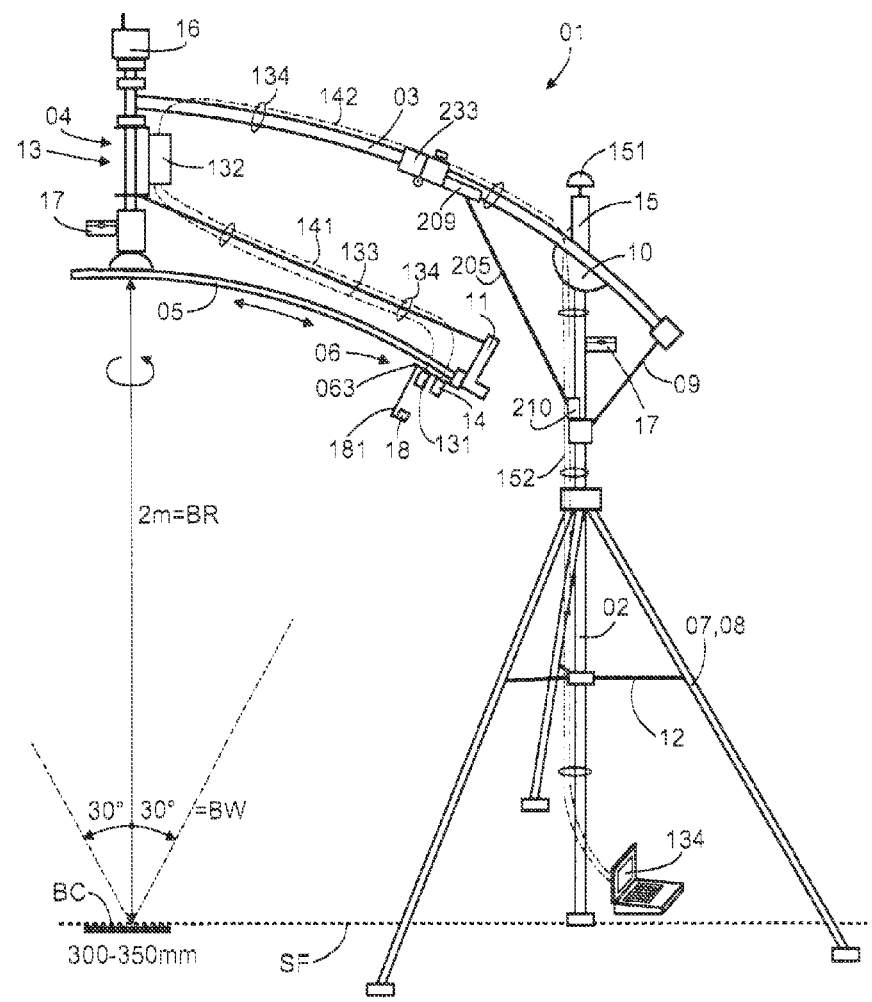

FIG. 10 shows a schematic in summary for the entire measurement set-up with the portable goniospectrometer 01 according to the invention. A spectrometer 13 for measuring the reflectance or specifically the radiance (for example GER 1500 of the company SVC, Spectra Vista Corporation) is illustrated schematically with the optical unit 131 and the sensor 132 (specifically radiance sensor—the irradiance spectrometer can be arranged on a stand-alone tripod next to the goniospectrometer 01 and connected to the analysis unit 134 using data technology), which are connected to one another using an optical fiber 133. In addition to the optical unit 131, a video camera 14 (for example webcam CM-3010 AF of the company HAMA) is arranged on the runner plate 063, the supply line 141 of which is likewise routed to the spectrometer 13. A connecting cable 142 runs from the spectrometer 13 along the cantilever 03 and the main pillar 02 to an analysis unit 134 for data storage and processing as an accessory of the spectrometer 13. Depending on flexibility, optical fibers 133 (glass-fiber cable) and supply line 141 are provided loosely with guide rings 134 and fixed on the arc strut 11, in order to allow flexible guiding to the slide 06. In order to prevent twisting of the optical fibers 133 and the supply line 141 about the suspension 04, the arc 05 is only rotated a maximum of one time in a full circle in one direction and then rotated back again. Furthermore, a second spectrometer 15 with a diffuser 151 for measuring the irradiance is arranged on the main pillar 02 in the region of the screw connection 10 and connected to the analysis unit 134 using a further connecting cable 152. For position detection, a satellite-based position detector 16 ("global positioning system" GPS, for example NL-402U USB of the company NAVILOCK) is provided on the upper end of the suspension 04, which is likewise connected to the analysis unit 134. A plurality of spirit levels 17 are arranged on the main pillar 02 and on the suspension 04 for the vertical alignment thereof. Also shown is a Spectralon plate 18 on a Spectralon support plate 181 for calibrating the optical unit 131.

In the illustration, the arc 05 has such a length that a maximum angle of observation of 30° from vertical (vertical axis VA) through the suspension 04 out into the observation center BC can be reached by displacing the slide 06. An observation cone of 60° therefore results from rotating the arc 05 about the suspension 04 in a full circle. This corresponds to the observation cone through a satellite ST with a pivot angle of 30°. The slide 06 (and thus the optical unit 131) can be fixed at any position on the associated spherical shell of this observation cone. For a predetermined capture angle of the optical unit 131, an observation center BC with an edge length of 300 mm can be detected in the position of the slide 06 vertically below the suspension 04 and for a position of the slide 06 at the free end of the arc 05 (displacement by n/6 or through an arc angle BW of 30°) an observation center with an arc length of approx. 350 mm can be detected.

A light, stable, yet robust and well transportable measuring device is made available by the portable goniospectrometer 01 according to the invention, which for the most part consists of standard parts and thus is relatively inexpensive to produce. Actuating the displaceable and rotatable elements does not take place by means of a motor, but rather manually. As a result, moisture-sensitive electronics are avoided. For an optical unit height BR of approx. 2 m above the natural surface SF, only a slight casting of shadow results due to the device itself. The device specifications comply with the imaging specifications for EnMAP. The data sheet for the portable goniospectrometer according to the invention shows the following key data:

| Overall height | 2.50 m |
|---|---|
| Weight (without spectrometer) | 21.5 kg |
| Material | Aluminium |
| Height of the optical unit above the object | 2.02 m |
| Ground sample distance GSD (nadir) | 30 cm |
| Ground sample distance GSD (30°) | 34.8 cm |
| Imaging possibility in azimuth | Full circle (360°) |
| Adjustment accuracy in azimuth | 1° |
| Imaging possibility in zenith | −30° to +30° |
| Adjustment accuracy in zenith | 1° |
| Time to carry out a series of measurements | Approx. 20 min (full circle) |

Figure 11:
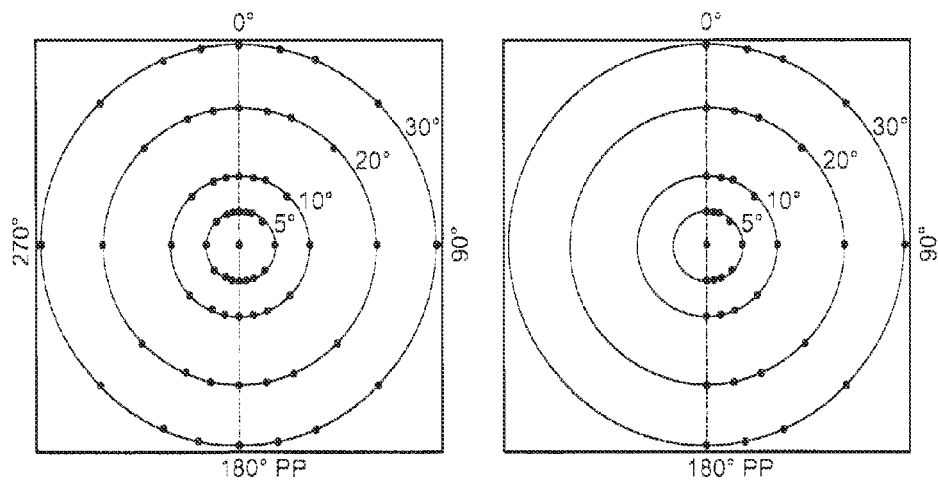
FIG. 10 shows a schematic for the entire measurement set-up and FIG. 11 shows measurement schemes for objects without and with an axis of symmetry.

FIG. 11 shows a possible measurement scheme for positioning the optical unit 131 for objects without an axis of symmetry (left, 61 measurement points) and with an axis of symmetry (right, 35 measurement points). By reducing the measurement points, carrying out a measuring cycle can be accelerated further, wherein this is of no further consequence in the case of an automated measurement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

01 Goniospectrometer
02 Main pillar
021 Upper pillar element
022 Lower pillar element
023 Connecting piece
024 Push-in coupler
025 Central web
026 Ground plate
027 Ground spike
028 Fixing plate
029 Lower pillar end
030 Upper pillar end
03 Cantilever
031 First cantilever element
032 Second cantilever element
033 Flange
034 Fixing screw
035 Ring
036 Locking lever
037 Fixed cantilever end
038 Free cantilever end
04 Suspension
040 Upper mounting plate
041 Central rod
042 Thread
043 Threaded nut
044 Fixing nut
045 Rotary tripod head
046 Lower mounting plate
047 Tommy screw
048 Hole
049 Tab
050 Scale
05 Arc
051 Fixing plate
052 Slot
053 Scale
054 Fixed arc end
055 Free arc end
06 Slide
061 Runner
062 Fixing screw
063 Runner plate
064 Hole
07 Tripod stand
071 Tripod leg
072 Upper leg element
073 Lower leg element
074 Screw connection
075 Ground plate
076 Ground spike
077 Screw connection plate
078 Stand sleeve
079 Knurled screw
080 Screw connection tab
081 Upper tripod leg element
082 Lower tripod leg element
08 Support
09 Cantilever strut
091 Sleeve 092 Sleeve
093 Knurled screw
094 Tab
095 Tab
096 Adjusting sleeve
097 Articulation
10 Screw connection
101 Pillar plate
102 Central hole
103 Locating hole
104 Cantilever plate
105 Central hole
106 Locating hole
107 Tommy screw
108 Locating pin
11 Arc strut
111 Bracing piece
112 Length adjuster
12 Tripod strut
121 Strut sleeve
122 Strut arm
123 Pillar sleeve
124 Locking screw
13 Spectrometer (radiance)
131 Optical unit (pre-optical unit)
132 Sensor
133 Optical fiber (glass fiber)
134 Analysis unit
14 Video camera
141 Supply line
142 Connecting cable
15 Spectrometer (irradiance)
151 Diffuser
152 Further connecting cable
16 Position detector
17 Spirit level
18 Spectralon plate
181 Spectralon support plate
200 Angular adjustment module
201 Upper adjusting ring
202 Central adjusting ring
201 Lower adjusting ring
204 Sliding-block guide
205 Cantilever support
206 Mounting hook
207 Storm cable
208 Flange plate
209 First support shoe
210 Second support shoe
211 Articulation
212 Lateral flat portion
214 Hinge pivot pin
215 Guide pin
216 Guide slot
217 Bolt
218 Nut
219 Toggle handle
220 Notch
221 Stop sleeve
220 Locking button
226 Ground plate
227 Ground spike
228 Ground shoe
233 Folding hinge
235 Half shell
242 Ball BC observation center
BL Arc length
BR Arc radius
BW Arc angle
CP Transverse plane
HZ Horizon
PP Ground plane
SF Natural surface
SN Insolation
ST Satellite
VA Vertical axis
$\Psi_n$ Azimuth angle
$\Theta_n$ Zenith angle

The invention claimed is:

1. A transportable goniospectrometer with a constant observation center for a radiometric measurement of a reflection of a natural surface, the goniospectrometer comprising:
a spectrometer having an optical unit and a sensor, the optical unit being connected to the sensor via an optical fiber;
a main pillar having a lower and an upper pillar end, the main pillar including a support with respect to the natural surface;
an arc having a fixed and a free arc end;
a slide disposed displaceably and fixably along the arc, the slide carrying the optical unit orientated towards the observation center; and
a cantilever having a fixed and a free cantilever end, the fixed cantilever end being connected to the upper pillar end of the main pillar via a screw connection, the free cantilever end having a suspension that is rotatable and fixable about a vertical axis aligned perpendicularly to the natural surface, the suspension being connected to the sensor of the spectrometer and to the fixed arc end of the arc, the suspension being configured to position the arc at a distance of the arc radius of the arc above the natural surface.

2. The transportable goniospectrometer according to claim 1, wherein the cantilever is arc-shaped.

3. The transportable goniospectrometer according to claim 1, wherein an arc length of the arc is such that, starting at the vertical axis, the slide is displaceable through an arc angle of 30° on the arc.

4. The transportable goniospectrometer according to claim 1, wherein the suspension rotatable through a full circle.

5. The transportable goniospectrometer according to claim 1, wherein the suspension is manually rotatable and the slide is manually displaceable.

6. The transportable goniospectrometer according to claim 1, wherein a scale is provided on the arc and the suspension.

7. The transportable goniospectrometer according to claim 1, wherein the fixed cantilever end of the cantilever extends beyond the screw connection and is connected to the main pillar behind the screw connection using a cantilever strut of adjustable length.

8. The transportable goniospectrometer according to claim 1, wherein the cantilever is supported on the main pillar using a cantilever support.

9. The transportable goniospectrometer according to claim 1, wherein the arc is connected to the suspension using an arc strut of adjustable length arranged at the free arc end.

10. The transportable goniospectrometer according to claim 1, wherein the support of the main pillar with respect to the natural surface is a tripod stand which is connected to the main pillar via a stand sleeve, the tripod stand including tripod legs each having a lower and an upper leg end, wherein each of the tripod legs is connected at the upper leg end to the stand sleeve and via a tripod strut to the main pillar, and wherein each of the tripod legs has at least two leg elements which are connected to one another such that a length of the tripod legs is adjustable.

11. The transportable goniospectrometer according to claim 10, wherein the lower pillar end of the main pillar and the lower leg ends of the tripod legs have ground plates configured to be fixed on the natural surface via ground spikes and fixing plates.

12. The transportable goniospectrometer according to claim 10, wherein the lower pillar end of the main pillar and the lower leg ends of the tripod legs have articulated ground plates configured to be fixed on the natural surface in ground shoes using ground spikes.

13. The transportable goniospectrometer according to claim 1, wherein the main pillar is formed by at least two pillar elements and the cantilever is formed by at least two cantilever elements, which are connected to one another so as to be of adjustable length and separable, wherein the pillar elements and the cantilever elements have such tolerances that the pillar elements and the cantilever elements are accomodatable in a compact transport case.

14. The transportable goniospectrometer according to claim 13, wherein the cantilever elements are connected to one another in a foldable manner via a fixable folding hinge.

15. The transportable goniospectrometer according to claim 1, wherein the screw connection between the main pillar and the cantilever is assembled from a pillar plate on the main pillar and a cantilever plate on the cantilever with a central hole and a series of locating holes, a tommy screw engaging in the central hole and a locating pin engaging in one of the locating holes so as to provide an adjustable an angle between the pillar plate and the cantilever plate.

16. The transportable goniospectrometer according to claim 1, wherein the rotatable suspension of the arc on the cantilever is assembled from a rotatable central rod with an upper mounting plate for the sensor of the spectrometer and a rotary tripod head with a lower mounting plate for fixing the fixed arc end of the arc.

17. The transportable goniospectrometer according to claim 16, wherein the upper mounting plate of the main pillar is arranged such that it radially points away on the rotatable central rod.

18. The transportable goniospectrometer according to claim 16, wherein the rotatable central rod has a ball at an upper end, which is accommodated by two mutually connectible half shells, wherein one of the half shells is securely connected to the free cantilever end.

19. The transportable goniospectrometer according to claim 18, wherein one of the half shells includes a mounting hook for mounting a storm cable and a flange plate for mounting a satellite-based position detector.

20. The transportable goniospectrometer according to claim 18, wherein the rotary tripod head is configured as an angular adjustment module having an upper adjusting ring configured to adjust a cardinal direction, a central adjusting ring configured to adjust an azimuth angle and a lower adjusting ring with at least one sliding-block guide for automated adjustability of an angle of the angular adjustment module.

21. The transportable goniospectrometer according to claim 1, further comprising a video camera and a Spectralon plate connected to the slide.

22. The transportable goniospectrometer according to claim 1, farther comprising a plurality of spirit levels for the perpendicular alignment of the main pillar and the optical unit with respect to at least one of the natural surface and a satellite-based position detector.

23. The transportable goniospectrometer according to claim 1, wherein at least the main pillar, the cantilever, the suspension, the arc, the slide and the support each are formed from black anodized aluminium.

24. The transportable goniospectrometer according to claim 1, wherein at least the screw connection between the main pillar and the cantilever, elements of the cantilever, elements of the arc, elements of the main pillar and leg elements of a tripod stand limning the support are configured to be adjusted manually without using a tool.

* * * * *